(12) United States Patent
Boulle et al.

(10) Patent No.: US 11,186,724 B2
(45) Date of Patent: Nov. 30, 2021

(54) REFLECTIVE COATING

(71) Applicant: SUN KING DIAMONDS LTD, Tortola (VG)

(72) Inventors: Jean-Raymond Boulle, Monte-Carlo (MC); Michael Angenent, Lanaken (BE); Michael Theobald, Buckinghamshire (GB)

(73) Assignee: SUN KING DIAMONDS LTD, Tortola (VG)

( * ) Notice: Subject to any disclaimer, the term of this patent is extended or adjusted under 35 U.S.C. 154(b) by 90 days.

(21) Appl. No.: 15/780,204

(22) PCT Filed: Dec. 2, 2016

(86) PCT No.: PCT/GB2016/053814
§ 371 (c)(1),
(2) Date: May 30, 2018

(87) PCT Pub. No.: WO2017/093760
PCT Pub. Date: Jun. 8, 2017

(65) Prior Publication Data
US 2018/0355186 A1    Dec. 13, 2018

(30) Foreign Application Priority Data

Dec. 4, 2015    (GB) ...................................... 1521463

(51) Int. Cl.
*C09D 5/33*    (2006.01)
*C09D 7/40*    (2018.01)
(Continued)

(52) U.S. Cl.
CPC ............... *C09D 5/004* (2013.01); *B05D 1/02* (2013.01); *B05D 5/063* (2013.01); *B05D 7/53* (2013.01); *C09D 7/69* (2018.01)

(58) Field of Classification Search
CPC . C09D 5/004; C09D 7/69; B05D 1/02; B05D 5/063; B05D 7/53
See application file for complete search history.

(56) References Cited

U.S. PATENT DOCUMENTS 5,190,807 A    3/1993   Kimock et al.
6,461,731 B1  10/2002   Veerasamy et al.
(Continued)

FOREIGN PATENT DOCUMENTS

CN    1065502 A      10/1992
CN    101746093 A  *  6/2010   ............... B05D 3/02
(Continued)

OTHER PUBLICATIONS

Author Unknown, Training manual for highway engineering cost personnel, Compilation group of training materials for highway engineering cost personnel, Jan. 31, 2010, pp. 221-222, China Building Materials, Industry Press.
(Continued)

*Primary Examiner* — Bijan Ahvazi
(74) *Attorney, Agent, or Firm* — Michael P. Alexander

(57) ABSTRACT

Compositions containing diamond particles for producing reflective coatings and methods of wet and dry application of diamond particles to substrates to produce reflective coatings. The coatings have a desirable appearance, are robust and easy to apply.

28 Claims, 16 Drawing Sheets

(51) Int. Cl.
  *B05D 1/02* (2006.01)
  *B05D 5/06* (2006.01)
  *B05D 7/00* (2006.01)

(56) References Cited

U.S. PATENT DOCUMENTS

| | | | |
|---|---|---|---|
| 6,586,098 | B1 | 7/2003 | Coulter et al. |
| 8,096,261 | B2 | 1/2012 | Steinmann et al. |
| 8,118,896 | B2 | 2/2012 | Can et al. |
| 2003/0021997 | A1 | 1/2003 | Veerasamy et al. |
| 2003/0207113 | A1 | 11/2003 | Coulter et al. |
| 2005/0028728 | A1 | 2/2005 | Liu et al. |
| 2005/0248696 | A1 | 11/2005 | Miller et al. |
| 2007/0267291 | A1* | 11/2007 | Hall ............ G01N 27/308 204/412 |
| 2009/0297828 | A1* | 12/2009 | Shenderova ......... C09D 5/32 428/323 |
| 2010/0068524 | A1* | 3/2010 | Dumm ............ C30B 33/08 428/403 |
| 2010/0266812 | A1* | 10/2010 | Lugg ............ B24D 18/0072 428/147 |

FOREIGN PATENT DOCUMENTS

| | | |
|---|---|---|
| CN | 101746093 A | 6/2010 |
| CN | 101768407 A | 7/2010 |
| DE | 202010002454 | 5/2010 |
| DE | 202010002454 U1 | 5/2010 |
| EP | 0106707 | 4/1984 |
| EP | 0106707 A1 | 4/1984 |
| EP | 1801290 | 6/2007 |
| EP | 1918336 A1 | 5/2008 |
| FR | 2922155 | 4/2009 |
| FR | 2922155 A1 | 4/2009 |
| JP | 1-154744 | 6/1989 |
| JP | 3-156401 | 7/1991 |
| JP | 03156401 | 7/1991 |
| JP | 4-337364 | 11/1992 |
| JP | 2003-183584 | 7/2003 |
| JP | 2011-26390 | 2/2011 |
| RU | 2162878 C2 | 2/2001 |
| RU | 2416529 C1 | 4/2011 |
| RU | 2471888 C2 | 10/2013 |
| WO | 9206843 A1 | 4/1992 |
| WO | 0210290 A1 | 2/2002 |
| WO | 0238515 A2 | 5/2002 |
| WO | 2012/069651 A1 | 5/2012 |
| WO | 2014115793 A1 | 7/2014 |

OTHER PUBLICATIONS

Ding Hao et al., New Functional Composite Coating and Application, Sep. 30, 2007, p. 63, 1st Edition, National Defense Industry Press.

Wang Fuyuan et al., Fly Ash Utilization Manual, Oct. 31, 2004, p. 566, 2nd Edition, China Electric Power Press.

* cited by examiner

REFLECTIVE COATING

The present application is a U.S. national stage application of PCT International Application No. PCT/GB2016/053814, filed Dec. 2, 2016, and published as PCT Publication WO 2017/093760 A1 on Jun. 8, 2017, which claims priority to United Kingdom Application No. GB 1521463.8, filed on Dec. 4, 2015. The disclosures of all the foregoing applications are hereby incorporated by reference in their entirety into the present application.

The present invention relates to methods for producing reflective coatings, a composition for producing reflective coatings and articles comprising a reflective coating.

It is known to incorporate metallic particles into a paint in order to provide a metallic appearance to painted objects. It is however difficult to obtain a coating containing metallic particles which has an even size distribution and desirable appearance. This is because larger metallic particles within a paint tend to sink to the bottom of a batch of the paint. The metallic particles which are applied to the surface may not therefore be representative of the whole distribution of particle sizes within the paint batch. An uneven distribution of particle sizes leads to a painted surface having an undesirable or inconsistent appearance.

Particles are also difficult to retrieve from paint which has dried on surfaces which were not intended to be painted. The paint must be removed from these surfaces and the particles in that paint then need to be recovered from the paint and recycled. Often particles will not be recycled or retrieved due to the inconvenience of this process. This is wasteful, especially if the particles in the paint are valuable.

When applying reflective particles to a surface, in a paint or otherwise, it is generally difficult to control the number of particles which are applied. It is therefore difficult to reliably tune the appearance of the surface and time consuming to ensure that even coverage is provided.

It is also desirable to provide a composition which, when applied to substrates, provides reflective coatings having an improved appearance. It is also desirable that any such composition is robust and easy to apply.

It is amongst the objects of the invention to solve one or more of the problems outlined above.

In a first aspect the invention provides a method for producing a reflective coating on a substrate, comprising the steps of;
i) applying a binder to a substrate,
ii) applying diamond particles, in the absence of a liquid carrier, to the binder so that the diamond particles adhere to the binder, and
iii) applying a protective layer over the diamond crystals and binder.

It has been found to be easier to apply large volumes of diamond particles to a substrate quickly using dry application, rather than as part of a liquid composition. A more even surface coating is also obtainable when compared to application as part of a liquid composition. Furthermore, fewer diamond particles are wasted compared to a liquid paint application in which the liquid paint is applied to a surface where a coating is not intended. Any diamond particles which do not end up on the surface after a first application using the present method may simply be swept up and re-applied in a further application. Recovery of the particles from a liquid is not necessary.

The substrate may be transparent. This is particularly useful when providing items of furniture with a luxury finish. The diamond particles are therefore visible through the substrate itself. This allows a wide variety of potentially opaque or translucent but robust protective layers to be used.

The protective layer may be opaque and may be black, silver or grey. It has been found that protective layers (which may be a seal layer, for example paint) having these opaque colours offer the best contrast to the reflective diamond particles and enhance the visual appearance. The substrate may be glass. This is particularly useful as glass is a common material used in interior design, for example, upon surfaces such as table tops. The method therefore allows the treatment of existing items of furniture.

The substrate may be opaque and is preferably black. This enables the coating of pre-painted substrates, for example vehicle body panels. When the substrate is opaque the opposite protective layer should be transparent. This allows the diamond particles to be viewed through the transparent layer and reflect light effectively.

The diamond particles will typically adhere to the binder in random orientations. This distinguishes the method from one in which diamond particles are purposely aligned. This provides a more efficient process for coating a substrate and ensures a degree of homogeneity in the optical reflective response. The binder may be a varnish.

The diamond particles may be applied to the binder by spraying. This provides a way of easily controlling the distribution of diamond particles on a substrate and applying large amounts of diamond particles quickly. The diamond particles may be applied to the binder using an airbrush.

The diamond particles may be non-spherical or irregular in shape and therefore do not have a defined particle diameter. In the present application the particle sizes are characterised by identifying a 'largest dimension' which means the longest measureable span of a particle (whether it is irregular or not). For a spherical particle this will be the diameter. For a cubic or rectilinear particle this will be an internal diagonal (corner to opposite corner). For an elongate shard or wedge this will be the length from apex to the blunt end. For a flake this will be the longest span of the flake. These sizes correspond to the size which may pass through a sieve to obtain a particle size upper limit.

Natural diamonds may be crushed using coventional (ball) milling techniques.

Gem stone off cuts may comprise polishing leftovers, so will essentially be under 1 mm in size, otherwise it would be ecomnomic to polish these for use as smaller gemstones.

Synthetic diamonds could be used, and would be provided in small sizes, followed by crushing/milling and then optinally sieving to the target sizes (for which see below).

A particularly preferred diamond particle source for the present invention is white diamond powder which is obtained from crushing bits and pieces of high quality polished left overs from gemstone cutting and polishing.

The diamond particles will typically have a size distribution including for example micron scale particles (or dust) up to larger mm size flakes and shards.

A desired size distribution may be obtained by sieving to remove particles that are too small, and separately sieving to remove particles that are too large.

The largest particle dimension typically dictates whether a particle will be sieved or not, although sieving is not of course completely effective and accurate so some variability in particle size will be evident outside of the target upper and lower parameters. Repeated sieving steps can be used to decrease the variability.

'Substantially all' when used with reference to the upper size limit of particles in the following means that the particles have been sieved to these target sizes, but there may be some residual particles which are just outside of the target size.

Substantially all of the diamond particles may have a largest dimension of 3 mm or less. This allows the particles to be used with conventional airbrush nozzles.

In certain embodiments substantially all of the diamond particles may have a largest dimension which is less than 1.21 mm. This allows the particles to be used with conventional airbrush nozzles whilst maintaining a highly reflective surface.

In other embodiments substantially all of the diamond particles may have a largest dimension of in the range of 50-175 µm, preferably 100-175 µm and preferably 145-175 µm. These sizes are particularly preferred for (but not limited to) application to a glass substrate as they provide a particularly appealing visual appearance when viewed through glass.

In further embodiments substantially all of the diamond particles may have a largest dimension in the range of 35-100 µm, preferably 35-55 µm, preferably 37-44 µm and preferably 44-53 µm. These sizes are particularly preferred for (but not limited to) application to an opaque substrate as they provide a particularly appealing visual appearance when viewed through a thin (e.g. 1-10 layers of clear coat) transparent coating against an opaque background (substrate).

In all cases above, the particle size ranges may be obtained by sieving.

The diamond particles are preferably (for best optical results) obtained by crushing larger particles. This means that they have a morphology consistent with having been crushed, which means that they have cleaved planes revealed which reflect incident light.

Preferably 20-40 g and more preferably 25-30 g of diamond particles are applied per square meter of substrate. This provides a desirable visual appearance.

In a second aspect the invention provides a liquid composition for producing a reflective coating, the composition comprising;
  diamond particles, and
  a binder which, when the liquid composition dries to form a solid coating, is transparent.

Such coatings provide a reflective surface with an appealing appearance.

Substantially all of the diamond particles may have a largest dimension in the range of 35-100 µm, preferably 35-55 µm, preferably 37-44 µm and preferably 44-53 µm. These size ranges, when applied in a liquid composition, provide an enhanced appearance, especially when viewed through a thin (eg. 1-10 layers of clear coat) transparent coating against an opaque background (substrate).

Substantially all of the diamond particles may have a largest dimension of in the range of 50-175 µm, preferably 100-175 µm and preferably 145-175 µm. The advantage of these size ranges is discussed above.

In all cases above, the particle size ranges may be obtained by sieving.

The diamond particles are preferably (for best optical results) obtained by crushing larger particles. This means that they have a morphology consistent with having been crushed, which means that they have cleaved planes revealed which reflect incident light.

The ratio between the mass of diamond particles and the mass of binder is preferably between 5:100 and 15:100, and is more preferably between 7:100 and 10:100. This provides a high enough concentration of diamond particles (especially for the size ranges mentioned above) to provide an enhanced appearance.

Substantially all of the diamond particles may have a largest dimension of 3 mm or less. Substantially all of the diamond particles may have a largest dimension which is less than 1.21 mm. The advantages of these size ranges are discussed above.

Preferably the binder is transparent, such as clear coat. Clear coat paint is paint or resin with no pigments and hence imparts no colour to the substrate upon which it is applied.

In a third aspect of the invention there is provided a method of producing a reflective coating, comprising the steps of;
  i) applying a composition as described above to a substrate, and
  ii) allowing the composition to dry or drying the composition to form the reflective coating.

Applying the composition described above provides an enhanced appearance as discussed above in relation to the composition itself. In step ii) the composition may be actively dried, for example by gentle heating, or allowed to dry naturally at room temperature.

The method may further comprise the step of;
  iii) applying a composition as described above over the reflective coating formed in step i),
    wherein substantially all of the diamond particles in the composition applied in step iii) have a largest dimension which is smaller than the largest dimension of substantially all of the diamond particles in the composition applied in step i). This allows layers of different sized diamond crystals to be built up. This allows the tuning of the surface properties to suit different light conditions.

The method may further comprise the step of applying a protective layer over the reflective coating. This is particularly useful where the surface is likely to receive wear.

The substrate may be transparent and the protective layer may be opaque and may be black, silver or grey. The substrate may be glass. The substrate may be opaque and is preferably black. The protective layer may be transparent. The advantages of these features are discussed above in relation to the method of dry application.

The composition may be applied to the substrate by spraying. The composition may be applied to the substrate using an airbrush. The composition may be applied so that 20-40 g, and preferably 25-30 g, of diamond particles are present in the reflective coating per square meter of substrate. The advantage of these features is discussed above in relation to the method of dry application.

In a fourth aspect of the invention there is provided an article comprising a reflective coating obtainable by a method as described above.

In a fifth aspect of the invention there is provided an article comprising a dried liquid composition as described above.

The articles may be items of furniture such as a table top, vehicles or the bodywork of a vehicle, or wearable items such as jewellery.

When referred to above, the term 'coating' does not necessarily imply a complete coating which completely encapsulates an item, substrate or article to which it is applied. Only a portion of an article, item or substrate might be covered with a 'coating'.

When diamond particles are referred to above, the particles are preferably diamond flakes. These flakes have a generally planar or plate-like shape.

These types of particles reflect light particularly well when held by a binder in a reflective layer.

The diamond particles are preferably natural diamonds. They may be off cuts or waste from diamond gemstone cutting in jewellery manufacture.

Usable gemstones for jewellery applications are typically 0.7 mm or above in size (the longest dimension of an irregular particle). Hence the raw material diamonds used in the present invention are typically less than 0.7 mm in size. These may then be crushed and sieved to the desired sizes.

The diamond particles are preferably white diamonds.

The diamond particles (of whatever initial size) may be subject to a crushing step so as to reduce average particle size, while ensuring cleaved planes (surfaces) are revealed so as to provide sparkling by reflection of incoming light. This is especially important where natural diamonds are sourced which have a naturally dull surface. These are crushed to provide the desired optical sparkle effects.

The diamond particles may be polished prior to incorporation into the composition or prior to use in the methods above. Non-industrial diamonds are typically used in these compositions and methods.

Diamond particles may be subjected to an acid wash prior to incorporation into the composition or prior to use in the methods above. This will clean the diamonds thoroughly. This process removes particles of metal shaving and dirt from the diamonds. An exemplary acid wash is as follows: A mixture of 1 part nitric and 2 parts sulfuric acid is mixed in a beaker, for example 20 to 50 ml, under an exhaust fan. The diamonds are then dropped into the solution and the beaker is placed onto a heating device such as a hot plate. The solution is heated until it boils for about a minute, optionally longer.

Glass particles may be incorporated into the diamond particle containing compositions described above and used in the methods described above. The glass particles are preferably spheres (beads). Preferably the glass beads have diameters which are larger than the maximum dimension of the diamond flakes.

Metal particles or flakes may also be incorporated into the diamond particle containing compositions described above and used in the methods described above. Metal flakes are available from Specialist Paints (http://www.specialistpaints.com/index.php). Glass beads for use in paints are available from Promain UK Limited, Promain House, Knowl Piece Business Park, Hitchin Hertfordshire, SG4 OTY (https://www.promain.co.uk/).

The application of glass beads and metal flakes is described in U.S. Pat. No. 3,228,897, the contents of which are hereby incorporated by reference.

When used with diamond particles according to the present invention, there appears to be a synergy between the metal and glass particles and the diamond particles. This provides a level of reflectivity which provides a particularly appealing finish.

It has also been found that including glass particles renders the coating more robust. This is particularly useful for automobile applications where protection against the elements is required. The metal and glass flakes in the composition apparently also help the coating to stand up to temperature tests from minus 38° C. to +40° C., which is particularly useful in automobile applications.

The binders described above may be a range of resin based finishes selected from the group of polyester, melamine, acrylic, alkyd melamine, polyurethane, nitrocellulose and cab acrylic. Products sold as 'Clear Coat', 'Top Coat', 'Gelcoat' and varnish may be used as the binder.

The protective layers described above may be a range of resin based finishes selected from the group of polyester, melamine, acrylic, alkyd melamine, polyurethane, nitrocellulose and cab acrylic. Products sold as 'Clear Coat', 'Top Coat', 'Gelcoat' and varnish may be used as a protective layer.

For automobile applications the paint system usually comprises the 1-pack primer for polypropylene, acrylic substrates and a resin based top-coat of polyurethane, nitrocellulose, acrylic, cab acrylic and polyester.

More than one layer of binder may be applied to obtain a smooth surface finish.

More than one protective layer may be applied to obtain a smooth surface finish.

Preferably when diamond particles are applied in a wet composition, the maximum diameter of the particles is less than 105 μm. This ensures that a smooth surface is easily obtainable by the application of a low number of layers (preferably one layer) of top coat.

Embodiments of the invention will now be described, with reference to the figures of the drawings, in which.

In the Examples below the diamond particle sizes quoted are in respect of the largest (maximum) dimension of each particle.

EXAMPLE 1

Diamond flakes were acquired. They were of mixed sizes and from natural cleaved diamonds.

The flakes obtained ranged from powder of a few microns to approximately 2.0 mm flakes. They were not sorted into sizes. The flakes were sieved to obtain substantially only particles having a maximum dimension of less than 1.15 mm. This was done because the largest airbrush nozzle which was available was 1.20 mm in diameter. Larger flakes would have clogged the nozzle.

A gloss varnish was then applied to the substrate. A Flakebuster® airbrush (available from TCP Global Corp) was used to apply the diamond flakes to a surface instead of suspending the flakes in a paint. That is to say, the application was dry flakes onto a wet binder (varnish). Diamond particles were sprayed onto the still wet surface of the varnish using compressed air. A pressure of 3 bar was used.

Consequently the flakes stuck into the wet varnish. Any flakes sprayed outside of the wet varnish were simply brushed together and re-used again. Using a Flakebuster® also means that flakes larger than 1.20 mm could also have been used. With a Flakebuster® one can apply flakes up to 3 mm in size.

In the initial sample some of the flakes where very thin but exceeded the diameter of 1.20 mm. They resembled small disks which would reflect the light well.

A base coat of wicked platinum was applied to a substrate prior to application of the varnish or flakes then a gloss varnish was applied over the base coat. Approximately 4 layers of the diamond flakes (having a maximum diameter of less than 1.15 mm) were sprayed onto the gloss varnish using the Flakebuster® whilst the gloss varnish was still wet/tacky.

A small strip of the coated substrate was coated with 'candy blue', a transparent blue varnish, at 50%. The strip and the rest of the coated substrate was then coated with 30 layers of clear coat (two component version) to cover the flakes completely and obtain a smooth surface.

The surface was then sanded with silicon carbide waterproof 3000 and finally buffed with a micro fibre cloth and polishing paste.

Figure 1:
FIG. 1 shows a coated substrate according to the invention.
Figure 2:
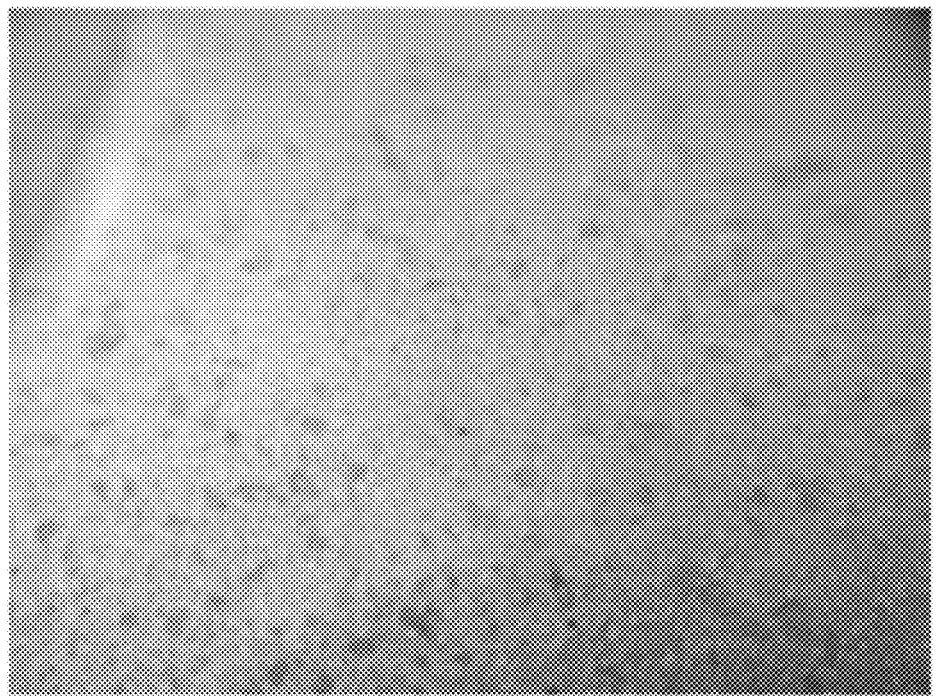
FIG. 2 shows a magnified view of a coated substrate shown in FIG. 1.
Figure 3:
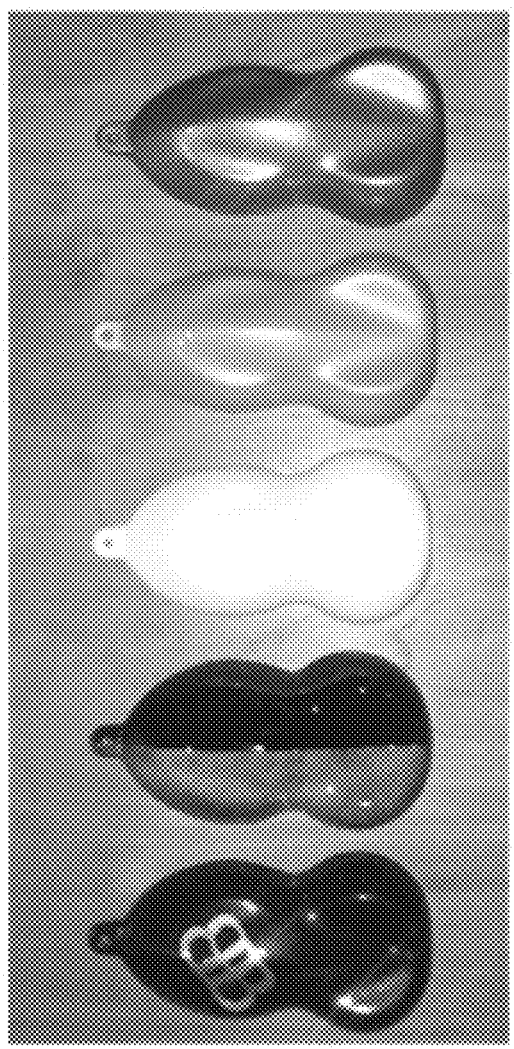
FIG. 3 shows the coated substrates of examples 2, 4, 5, 6 and 7 according to the invention.
Figure 4:
FIGS. 4 and 5 show further views of the coated substrate of example 7 according to the invention.
Figure 5:
Figure 6:
FIG. 6 shows coated substrate of example 6 according to the invention.

The results are shown in FIGS. 1 and 2. FIG. 1 shows the coated substrate and its blue strip portion. FIG. 2 shows the coated substrate (non-blue strip portion) at 10× magnification.

The coated surfaces have an appealing finish which is also robust and quick to apply.

EXAMPLES 2-7

Wet, and Alternatively, Dry Application

Five compositions having diamond particles with different ranges of maximum dimensions were prepared as follows. Diamond powders formed from crushed natural diamonds were obtained to provide diamond particles. The desired particle size ranges were obtained using the sieving method discussed below in relation to the 'glass substrate' examples. Size ranges refer to the maximum dimension of the particles in question. Other methods of size selection are however available.

The application was either wet or dry (as detailed in the examples below) to professional display models measuring 21×12×5 cm i.e. approximately 1:20 times the size of a car. Wet application was done with the diamond particles premixed in a clear coat and sprayed onto the surface. Dry application was done generally as described above in the preliminary tests.

Additional layers of clear coat where applied in order to guarantee a smooth surface.

EXAMPLE 2

Blue model (with trademark): 53-105 μm diamond particles, approximately 0.3 g/1.5 ct, mixed in clear coat (i.e. wet application).

EXAMPLE 3

Black model: 44-53 μm diamond particles, approximately 1 gram/5 ct, dry application on half the model.

EXAMPLE 4

Pearl white model: 149-177 μm diamond particles, approximately 0.1 gr/0.5 ct, mixed in clear coat (i.e. wet application) and a second layer with 105-149 μm, approximately 0.2 gr/1 ct, mixed in clear coat (i.e. wet application).

EXAMPLE 5

Orange model: 37-44 μm diamond particles, approximately ½ gram/2.5 ct, dry application.

EXAMPLE 6

Green model: 37-44 μm diamond particles, approximately 1.5 gram/7.5 ct, dry application.

EXAMPLE 7

A half/half model was made to show the difference between the black base coat paint and the diamond containing composition (as described in example 3 above).

The results are shown in FIGS. 3-6. The overall visual effect of these coatings is very appealing. It was found to be easier to apply greater volumes of diamond on the surface using dry application. The black background seems to provide the best effect. The distinction between the diamond containing composition and the paint is striking.

When applying diamond containing compositions as a liquid, it was found that one should not use flakes having a maximum dimension larger than 105 μm in order to guarantee a smooth surface. This is particularly useful in automobile applications.

EXAMPLES 8-10

Glass Substrate

A composition containing diamond particles was applied to sheets of glass in order to test the visual effect of the diamond containing composition for use in the finishing of luxury goods, for example interiors.

Compositions containing three different size ranges of (crushed) natural diamond particles were prepared. Diamond particles of the required size ranges were obtained using two sieving steps. The first sieving step removed particles which have a maximum dimension which is larger than a desired upper limit. The second sieving step removed smaller particles which fall through the second sieve. The particles retained on the second sieve have a minimum dimension which is larger than the apertures in the second sieve. It is the particles retained on the second sieve which have maximum diameters within the desired size ranges. It was these particles that were used in the compositions. However, other methods for obtaining desired size distributions are available, not least (given the high value of the product) selecting appropriate diamond crystals by hand, optionally with the aid of a microscope.

The compositions prepared contained differing proportions of diamond particles and binder.

EXAMPLE 8

Diamond particle size: 53-105 μm,
5 g of diamond particles in 100 g of clear coat.

EXAMPLE 9

Diamond particle size: 105-149 μm,
7 g of diamond particles in 100 g of clear coat.

EXAMPLE 10

Diamond particle size: 149-172 μm,
10 g in 100 g of clear coat.

To produce each composition diamond particles having the appropriate sizes were thoroughly mixed in the appropriate proportions into clear coat. In each of the examples 8, 9 and 10 the composition was applied using a Flakebuster® airbrush (available from TCP Global Corp) to a primed glass surface. Application was done twice, crossways. The glass was then sealed with an opaque black lacquer which was applied over the clear coat containing the diamond particles.

Figure 7:
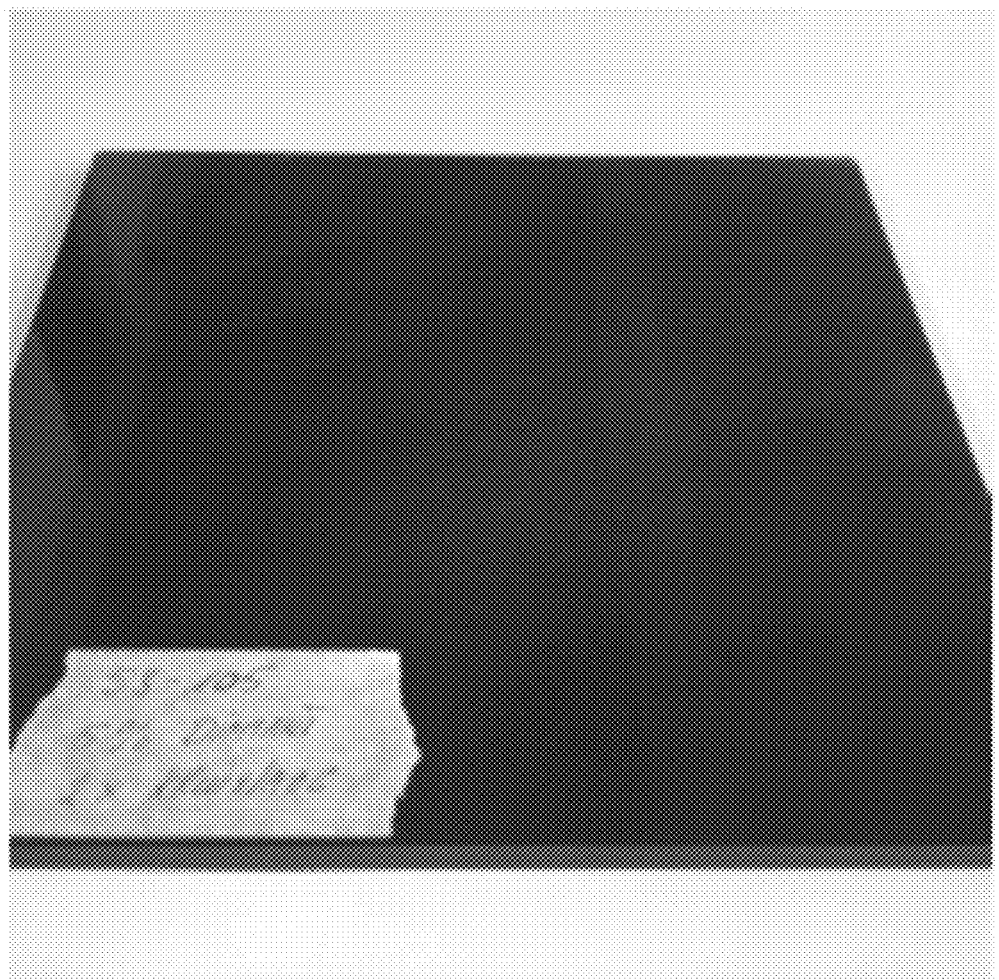
FIG. 7 shows a coating according to the invention produced using the composition of example 8.
Figure 8:
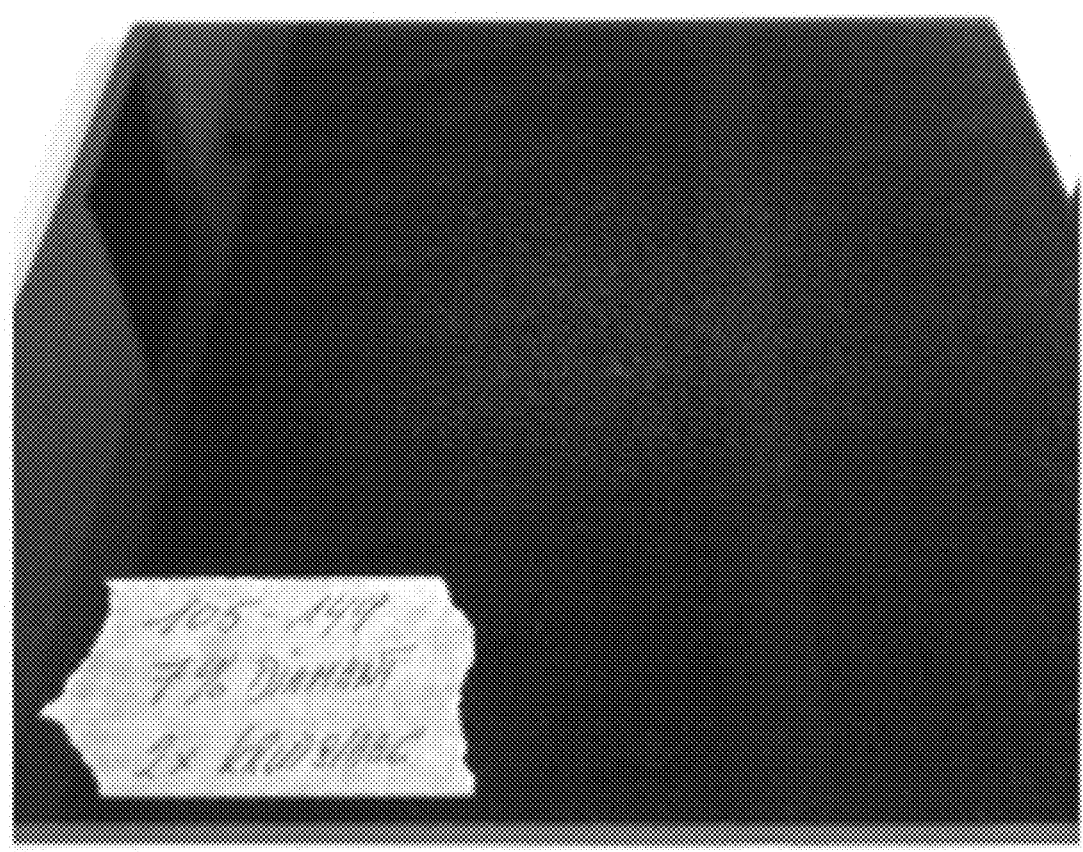
FIGS. 8, 10 and 11 show a coating according to the invention produced using the composition of example 9.
Figure 9:
FIG. 9 shows a coating according to the invention produced using the composition of example 10.
Figure 10:
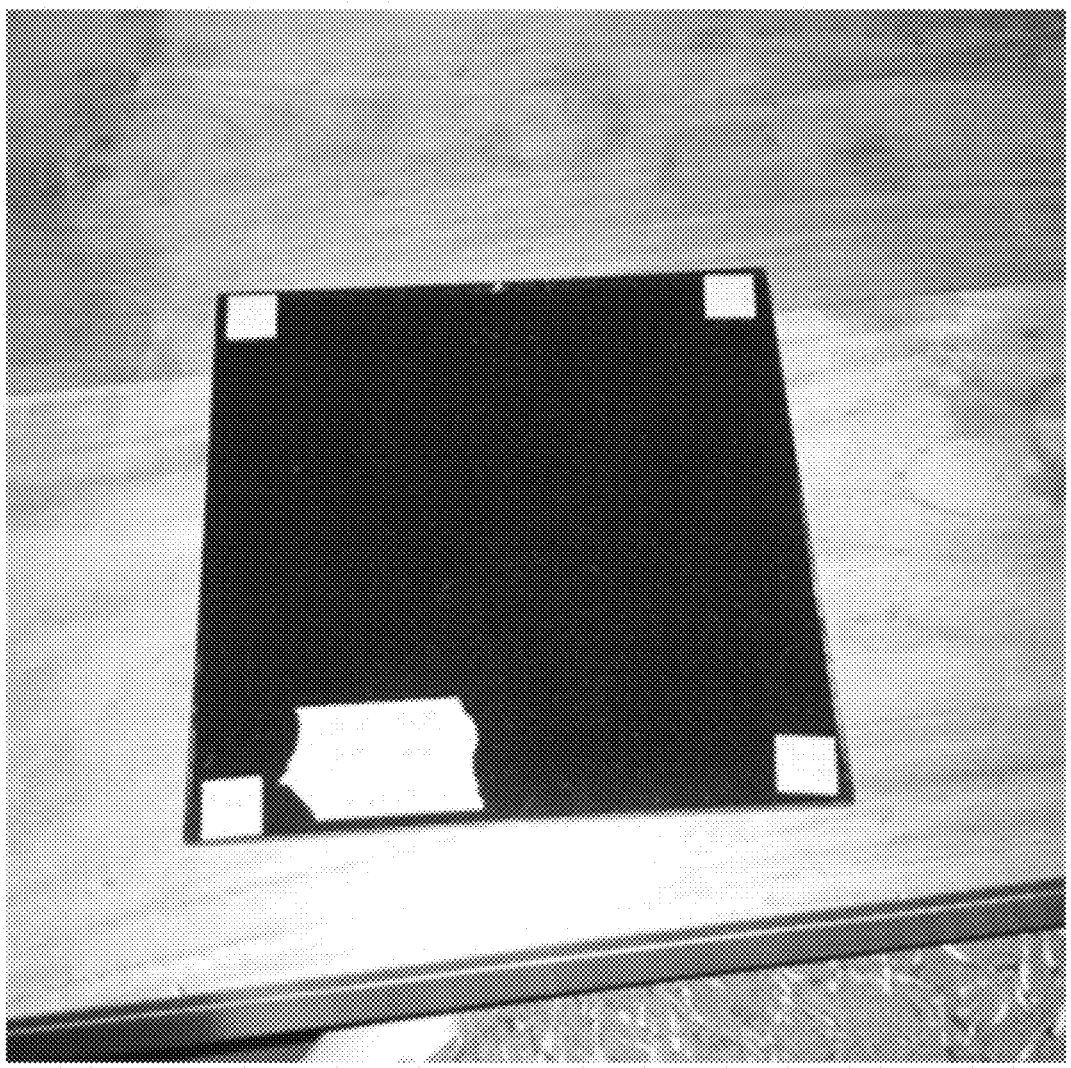
Figure 11:
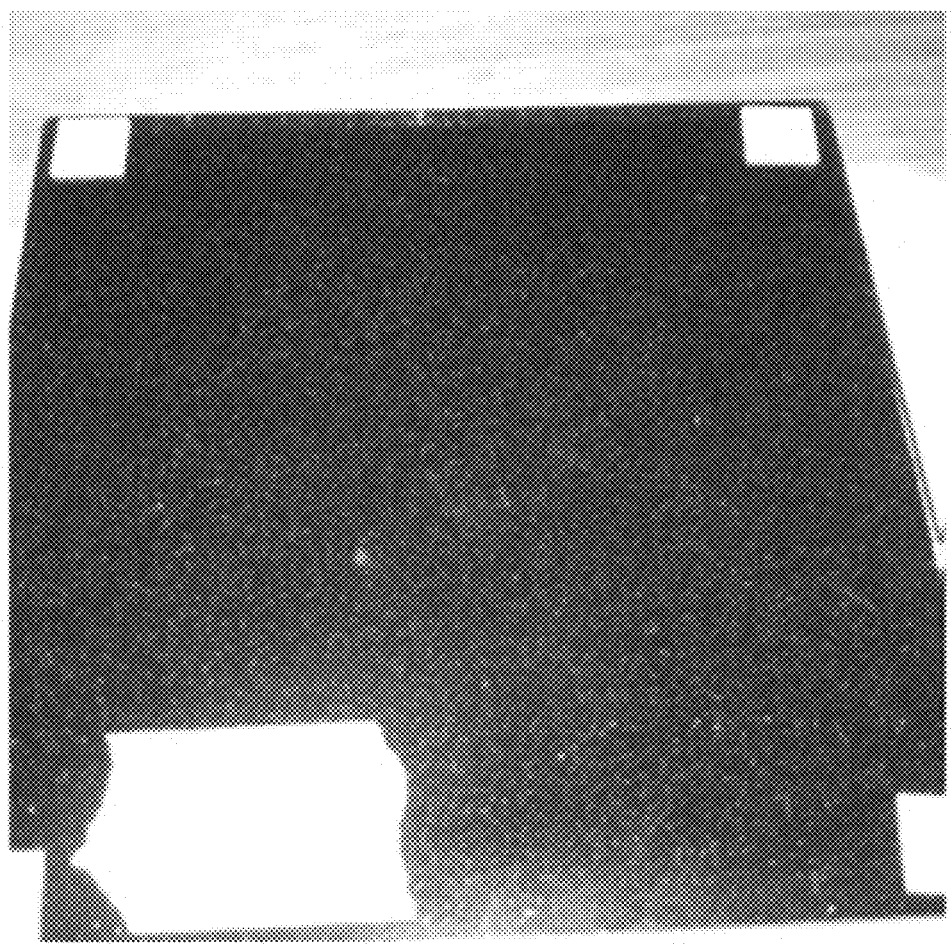
Figure 12:
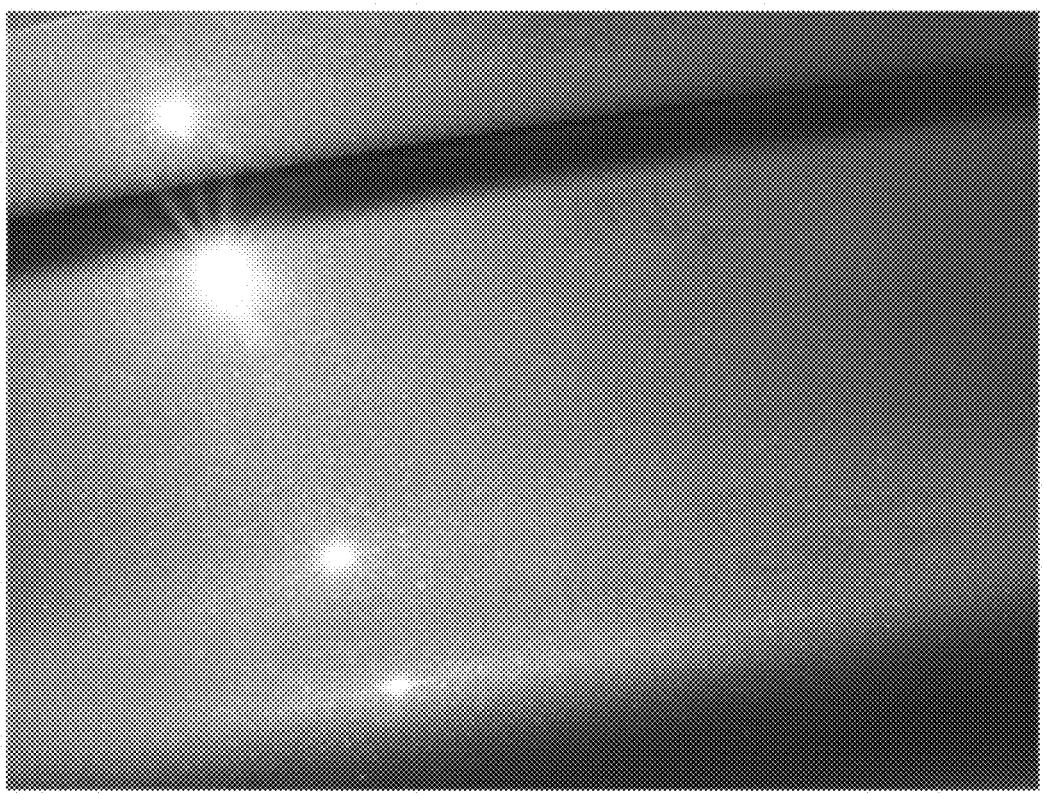
FIGS. 12-16 show coatings according examples 11-14 of the invention.
Figure 13:
Figure 14:
Figure 15:
Figure 16:

FIG. 7 shows the coating produced using the composition of example 8. FIGS. 8, 10 and 11 show the coating produced using the composition of example 9. FIG. 9 shows the coating produced using the composition of example 10.

All of the coatings produced are visually appealing. Mixing the particles with the clear coat resulted in the heavier particles dropping to the bottom of the clear coat quite quickly which made application more difficult. The compositions were therefore constantly agitated during application. Because of this there was a low distribution on the glass surface of the larger flakes.

It is preferable to apply approximately 300 g of each composition per square meter. This equates to approximately 25 to 30 g of diamond particles (125 to 150 ct) per square meter to obtain an appealing finish.

EXAMPLES 11-14

Automobile Applications

The following components were applied to a substrate using conventional spraying techniques:
1. An undercoat/base primer coat,
2. Top colour coats (of a number of different colours were used depending on the depending on the example), and
3. Two top coats of a resin-based layer containing 150 to 200 µm crushed natural diamond particles. The coating was applied so that no diamond points were sticking out above the coating. The top coats also contained metallic/metal flakes and glass beads.

Example 11 was based on a silver undercoat. Example 12 was based on a pearl undercoat. Example 13 was based on a blue undercoat. Example 14 was based upon a black undercoat.

The top coats may be a range of resin based finishes comprising polyester, melamine, acrylic and alkyd melamine. For automobile applications the paint system usually comprises the 1-pack primer for polypropylene and acrylic substrates and a resin based top-coat of polyurethane, nitrocellulose, acrylic, cab acrylic and polyester.

Metal flakes and glass flakes for use in paints are commercially available. Their application is described in U.S. Pat. No. 3,228,897, the contents of which are hereby incorporated by reference. In the present invention however, there appears to be synergy between the metal and glass flakes and the diamond particles. This is shown by the particularly appealing finish in FIGS. 11-16.

It has also been found that including glass particles renders the coatings more robust. This is particularly useful for automobile applications where protection against the elements is required. The metal and glass flakes in the composition also help the coating to stand up to temperature tests from minus 38° C. to +40° C., which is particularly useful in automobile applications.

Summary—The invention provides diamond particle-containing compositions for producing reflective coatings and methods of wet and dry application of diamond particles to substrates to produce reflective coatings. The coatings have a desirable appearance, are robust and easy to apply.

The invention claimed is:

1. A liquid composition comprising:
   visible, reflective diamond particles, wherein substantially all of the diamond particles have a largest dimension in the range of 35-175 µm; and
   a binder which is transparent when the liquid composition dries to form a solid coating,
   wherein the liquid composition is used for producing the solid coating, wherein said diamond particles are visible and reflective in the solid coating.

2. The liquid composition according to claim 1, wherein substantially all of the diamond particles have a largest dimension in the range of 35-100 µm.

3. The liquid composition according to claim 1, wherein substantially all of the diamond particles have a largest dimension in the range of 50-175 µm.

4. The liquid composition according to claim 1, wherein the particle size ranges are obtained by sieving.

5. The liquid composition according to claim 1, wherein the diamond particles are natural diamond particles.

6. The liquid composition according to claim 1, wherein the ratio between the mass of the diamond particles and the mass of the binder is between 5:100 and 15:100.

7. The liquid composition according to claim 1, wherein the binder is transparent.

8. A method of producing a reflective coating, comprising the steps of:
   (i) applying liquid composition of claim 1 to a substrate; and
   (ii) causing or allowing the composition to dry to form an initial reflective coating.

9. The method according claim 8, wherein the method further comprises the step of:
   (iii) applying a further said liquid composition over the initial reflective coating, wherein substantially all of the diamond particles in the further composition applied in step (iii) have a largest dimension which is smaller than the largest dimension of substantially all of the diamond particles in the initial reflective coating.

10. The method according to claim 8, wherein the method further comprises the step of:
    (iii) applying a further said liquid composition over the initial reflective coating, wherein substantially all of the diamond particles in the further composition applied in step (iii) have a largest dimension which is larger than the largest dimension of substantially all of the diamond particles in the initial reflective coating.

11. The method according to claim 8, wherein the method further comprises the step of applying a protective layer over the initial reflective coating.

12. The method according to claim 11, wherein the substrate is transparent and wherein the protective layer is opaque.

13. The method according to claim 11, wherein the substrate is opaque, and wherein the protective layer is transparent.

14. The method according to claim 8, wherein the substrate is glass.

15. The method according to claim 8, wherein the diamond particles have a morphology consistent with having been obtained by crushing larger particles.

16. The method according to claim 8, wherein the diamond particles are natural diamond particles.

17. The method according to claim 8, wherein the composition is applied so that 20-40 g of diamond particles are present in the reflective coating per square meter of substrate.

18. The method according to claim 8, wherein the composition is applied so that 25-30 g of diamond particles are present in the reflective coating per square meter of substrate.

19. An article comprising a dried liquid composition according to claim 1.

20. The article according to claim 19, wherein the article is an item of furniture, or a vehicle, or a wearable item, or an architectural feature.

21. The liquid composition according to claim 1, wherein substantially all of the diamond particles have a largest dimension in the range of 35-55 μm.

22. The liquid composition according to claim 1, wherein substantially all of the diamond particles have a largest dimension in the range of 37-44 μm.

23. The liquid composition according to claim 1, wherein substantially all of the diamond particles have a largest dimension in the range of 44-53 μm.

24. The liquid composition according to claim 1, wherein substantially all of the diamond particles have a largest dimension in the range of 100-175 μm.

25. The liquid composition according to claim 1, wherein substantially all of the diamond particles have a largest dimension in the range of 145-175 μm.

26. The liquid composition according to claim 1, wherein the diamond particles are natural diamond particles and have a morphology consistent with having been obtained by crushing larger particles.

27. The liquid composition according to claim 1, wherein the ratio between the mass of the diamond particles and the mass of the binder is between 7:100 and 10:100.

28. The liquid composition according to claim 1, wherein the binder is clear coat.

* * * * *